(12) United States Patent
Shraga et al.

(10) Patent No.: US 11,687,514 B2
(45) Date of Patent: Jun. 27, 2023

(54) MULTIMODAL TABLE ENCODING FOR INFORMATION RETRIEVAL SYSTEMS

(71) Applicant: INTERNATIONAL BUSINESS MACHINES CORPORATION, Armonk, NY (US)

(72) Inventors: Roee Shraga, Haifa (IL); Haggai Roitman, Yoknea'm Elit (IL); Guy Feigenblat, Givataym (IL); Mustafa Canim, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 16/929,194

(22) Filed: Jul. 15, 2020

(65) Prior Publication Data

US 2022/0043794 A1    Feb. 10, 2022

(51) Int. Cl.
*G06F 16/22* (2019.01)
*G06F 16/93* (2019.01)
(Continued)

(52) U.S. Cl.
CPC ........ *G06F 16/2282* (2019.01); *G06F 16/212* (2019.01); *G06F 16/245* (2019.01); *G06F 16/93* (2019.01)

(58) Field of Classification Search
CPC .. G06F 16/2282; G06F 16/212; G06F 16/245; G06F 16/93
See application file for complete search history.

(56) References Cited

U.S. PATENT DOCUMENTS

| 8,489,597 B2 * | 7/2013 | Shadmon | G06F 16/835 |
| | | | 707/742 |
| 9,292,789 B2 * | 3/2016 | Shiv | G06N 3/04 |

(Continued)

FOREIGN PATENT DOCUMENTS

| CN | 102447559 A | 1/2015 |
| CN | 104516719 A | 3/2017 |

OTHER PUBLICATIONS

Notification of Transmittal of the International Search Report and Written Opinion of the International Searching Authority, or the Declaration, International application No. PCT/IB2021/055987, Applicant's or agent's file reference P201908958, dated Sep. 28, 2021, 6 pages.

(Continued)

*Primary Examiner* — Miranda Le
(74) *Attorney, Agent, or Firm* — Anthony R. Curro

(57) ABSTRACT

Multimodal table encoding, including: Receiving an electronic document that contains a table. The table includes multiple rows, multiple columns, and a schema comprising column labels or row labels. The electronic document includes a description of the table which is located externally to the table. Next, operating separate machine learning encoders to separately encode the description, schema, each of the rows, and each of the columns of the table, respectively. The schema, the rows, and the columns are encoded together with end-of-column tokens and end-of-row tokens that mark an end of each column and row, respectively. Then, applying a machine learning gating mechanism to the encoded description, encoded schema, encoded rows, and encoded columns, to produce a fused encoding of the table, wherein the fused encoding is representative of both a structure of the table and a content of the table.

18 Claims, 4 Drawing Sheets

(51) Int. Cl.
G06F 16/245 (2019.01)
G06F 16/21 (2019.01)

(56) References Cited

U.S. PATENT DOCUMENTS

| | | | |
|---|---|---|---|
| 9,390,115 B2* | 7/2016 | Liu | G06F 16/2282 |
| 9,454,524 B1* | 9/2016 | Modani | G06K 9/6215 |
| 10,157,309 B2* | 12/2018 | Molchanov | G06K 9/6251 |
| 10,395,118 B2* | 8/2019 | Yu | G06V 20/40 |
| 10,810,472 B2* | 10/2020 | Malak | G06K 9/6217 |
| 2003/0126144 A1* | 7/2003 | O'Halloran | G06F 16/283 |
| 2004/0194009 A1* | 9/2004 | LaComb | G06F 40/103 |
| | | | 715/239 |
| 2006/0288268 A1* | 12/2006 | Srinivasan | G06F 16/86 |
| | | | 715/210 |
| 2012/0011115 A1 | 1/2012 | Madhavan | |
| 2013/0254171 A1 | 9/2013 | Grondin | |
| 2016/0012051 A1 | 1/2016 | Zoryn | |
| 2017/0169315 A1* | 6/2017 | Vaca Castano | G06V 10/25 |
| 2017/0293697 A1 | 10/2017 | Siham | |
| 2019/0065502 A1 | 2/2019 | Lee | |
| 2019/0087726 A1* | 3/2019 | Greenblatt | G06K 9/627 |
| 2019/0325045 A1 | 10/2019 | Williams | |

OTHER PUBLICATIONS

B. Fetahu et al., "TableNet: An Approach for Determining Fine-grained Relations for Wikipedia Tables," in Proceedings of the 2019 World Wide Web Conference, San Francisco, CA (2019).
C. S. Bhagavatula et al., "Methods for Exploring and Mining Tables on Wikipedia," in Proceedings of IDEA'13, Chicago, IL, USA, (2013).
C. S. Bhagavatula et al., "TabEL: Entity Linking in Web Tables," in Proceedings of The 14th International Semantic Web Conference (2015).
H. Sun et al., "Table cell search for question answering," in Proceedings of the 25th International Conference on World Wide Web (WWW '16), pp. 771-782, Geneva, Switzerland (2016).
H. Zamani et al., "Neural Ranking Models with Multiple Document Fields," in Proceedings of WSDM '18, Los Angeles, CA (2018).
J. Arevalo et al., "Gated Multimodal Units for Information Fusion," in the 5th International Conference on Learning Representations (ICLR), Toulon, France (2017).
L. Deng et al., "Table2Vec: Neural Word and Entity Embeddings for Table Population and Retrieval," in Proceedings of SIGIR 2019 (2019).
M. Cafarella et al., "WebTables: Exploring the Power of Tables on the Web," VLDB '08, Auckland, New Zealand, (2008).
P. Jain et al., "A Mixed Hierarchical Attention based Encoder-Decoder Approach for Standard Table Summarization," arXiv:1804.07790 [cs.CL] (2018).
P. Pyreddy et al., "Tintin: A system for retrieval in text tables," in Proceedings of the Second ACM International Conference on Digital Libraries (DL '97), pp. 193-200, New York, NY, USA (1997).
P. Venetis et al., "Recovering semantics of tables on the web," in Proceedings of the VLDB Endowment, vol. 4, No. 9 (2011).
R. L. Logan et al., "Multimodal Attribute Extraction," in Proceedings of the 31st Conference on Neural Information Processing Systems (NIPS 2017), Long Beach, CA, USA (2017).
R. Pimpikar et al., "Answering Table Queries on the Web using Column Keywords," in Proceedings of the VLDB Endowment (PVLDB), vol. 5, No. 10, pp. 908-919 (2012).
R. Shraga et al., "Ad Hoc Table Retrieval using Intrinsic and Extrinsic Similarities," in Proceedings of the Web Conference 2020, Taipei, Taiwan (2020).
R. Shraga et al., "Projection-based Relevance Model for Table Retrieval," in Proceedings of the Web Conference 2020, Taipei, Taiwan (2020).
S. Zhang et al., "Ad Hoc Table Retrieval using Semantic Similarity," in Proceedings of the Web Conference 2018 (2018).
T. Baltrusaitis et al., "Multimodal machine learning: A survey and taxonomy," arXiv:1705.09406 [cs.LG] (2017).
Y. Liu et al, "TableRank: A Ranking Algorithm for Table Search and Retrieval," Proceedings of the 22nd AAAI Conference on Artificial Intelligence, Vancouver, BC, Canada (2007).
Y. Liu et al, "Tableseer: Automatic table metadata extraction and searching in digital libraries," in Proceedings of the 7th ACM/IEEE-CS Joint Conference on Digital Libraries (JCDL '07), pp. 91-100, New York, NY, USA (2007).
Y. Sun et al., "Content-based table retrieval for web queries," Neurocomputing 349, pp. 183-189 (2019).

* cited by examiner

MULTIMODAL TABLE ENCODING FOR INFORMATION RETRIEVAL SYSTEMS

BACKGROUND

The invention relates to the field of computerized information retrieval.

Information retrieval systems typically operate by receiving a query and searching for pertinent information in a corpus of electronic data—be it text, images, audio, video, or any other type of data. For example, Web search engines receive user queries and search for respective information in the World Wide Web. Technically, the searches are conducted in a centralized index of the World Wide Web maintained by each search engine, to facilitate near real-time provision of search results. Similar indexing and searching exist in many organizational information retrieval systems, which are used for conducting searches in the organization's internal collection (corpus) of electronic documents and other data.

Electronic documents, which typically contain unstructured data in the form of free text, sometimes also include tables—which are a form of structured data. Since tables are organized in accordance with a certain schema which offers column and/or row labels, they can be regarded as small, structured databases. Data contained in tables is often of high quality, and enabling information retrieval systems to index and search such tabular data is of great benefit.

Due to the vast number of tables used in HTML (HyperText Markup Language) on the World Wide Web, a field known as "Web table retrieval" has emerged. Many automated Web table retrieval techniques have been developed and proposed, which typically operate by receiving a search query in natural language and returning a ranked listed of the most relevant Web tables found.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising, automatically: (a) receiving an electronic document that contains a table, wherein: the table comprises multiple rows, multiple columns, and a schema comprising column labels or row labels; and the electronic document comprises a description of the table which is located externally to the table; (b) operating separate machine learning encoders to separately encode the description of the table, the schema of the table, each of the rows of the table, and each of the columns of the table, respectively, wherein: (i) the schema of the table is encoded together with end-of-column tokens or end-of-row tokens, that mark an end of each of the column or row labels, respectively, (ii) each of the rows of the table is encoded together with end-of-column tokens that mark an end of each data cell of the respective row, and with an end-of-row token that marks an end of the respective row, and (iii) each of the columns of the table is encoded together with end-of-row tokens that mark an end of each data cell of the respective column, and with an end-of-column token that marks an end of the respective column; (c) applying a machine learning gating mechanism to the encoded description, encoded schema, encoded rows, and encoded columns, to produce a fused encoding of the table, wherein the fused encoding is representative of both a structure of the table and a content of the table; and (d) storing the fused encoding of the table in an index of a computerized information retrieval system.

Another embodiment is directed to a system comprising: (i) at least one hardware processor; and (ii) a non-transitory computer-readable storage medium having program code embodied therewith, the program code executable by said at least one hardware processor to, automatically: (a) receive an electronic document that contains a table, wherein: the table comprises multiple rows, multiple columns, and a schema comprising column labels or row labels; and the electronic document comprises a description of the table which is located externally to the table; (b) operate separate machine learning encoders to separately encode the description of the table, the schema of the table, each of the rows of the table, and each of the columns of the table, respectively, wherein: (I) the schema of the table is encoded together with end-of-column tokens or end-of-row tokens, that mark an end of each of the column or row labels, respectively, (II) each of the rows of the table is encoded together with end-of-column tokens that mark an end of each data cell of the respective row, and with an end-of-row token that marks an end of the respective row, and (III) each of the columns of the table is encoded together with end-of-row tokens that mark an end of each data cell of the respective column, and with an end-of-column token that marks an end of the respective column; (c) apply a machine learning gating mechanism to the encoded description, encoded schema, encoded rows, and encoded columns, to produce a fused encoding of the table, wherein the fused encoding is representative of both a structure of the table and a content of the table; and (d) store the fused encoding of the table in an index of a computerized information retrieval system.

A further embodiment is directed to a computer program product comprising a non-transitory computer-readable storage medium having program code embodied therewith, the program code executable by at least one hardware processor to: (a) receive an electronic document that contains a table, wherein: the table comprises multiple rows, multiple columns, and a schema comprising column labels or row labels; and the electronic document comprises a description of the table which is located externally to the table; (b) operate separate machine learning encoders to separately encode the description of the table, the schema of the table, each of the rows of the table, and each of the columns of the table, respectively, wherein: (i) the schema of the table is encoded together with end-of-column tokens or end-of-row tokens, that mark an end of each of the column or row labels, respectively, (ii) each of the rows of the table is encoded together with end-of-column tokens that mark an end of each data cell of the respective row, and with an end-of-row token that marks an end of the respective row, and (iii) each of the columns of the table is encoded together with end-of-row tokens that mark an end of each data cell of the respective column, and with an end-of-column token that marks an end of the respective column; (c) apply a machine learning gating mechanism to the encoded description, encoded schema, encoded rows, and encoded columns, to produce a fused encoding of the table, wherein the fused encoding is representative of both a structure of the table and a content of the table; and (d) store the fused encoding of the table in an index of a computerized information retrieval system.

In some embodiments, the separate machine learning encoders comprise a Recurrent Convolutional Neural Network (RCNN) that encodes the description of the table.

In some embodiments, the separate machine learning encoders comprise a Multi-Layer Perceptron (MLP) that encodes the schema of the table, or a transformer that encodes the schema of the table.

In some embodiments, the separate machine learning encoders comprise: a first Three-Dimensional Convolutional Neural Network (3D-CNN) that encodes the rows of the table; and a second 3D-CNN that encodes the columns of the table.

In some embodiments, the machine learning gating mechanism comprises a Gated Multimodal Unit (GMU).

In some embodiments, the method further comprises, or the program code further executable for, prior to the encoding of the description, schema, rows, and columns: automatically transforming the description, schema, rows, and columns into token embeddings.

In some embodiments, the method further comprises, or the program code further executable for, automatically: receiving a search query; operating the machine learning encoder that encoded the description to encode the search query; and operating the computerized information retrieval system to search the index based on the encoded search query, and to return at least some of the table as a search result.

In some embodiments, the method further comprises, or the program code further executable for, prior to the encoding of the search query: automatically transforming the search query into one or more token embeddings.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
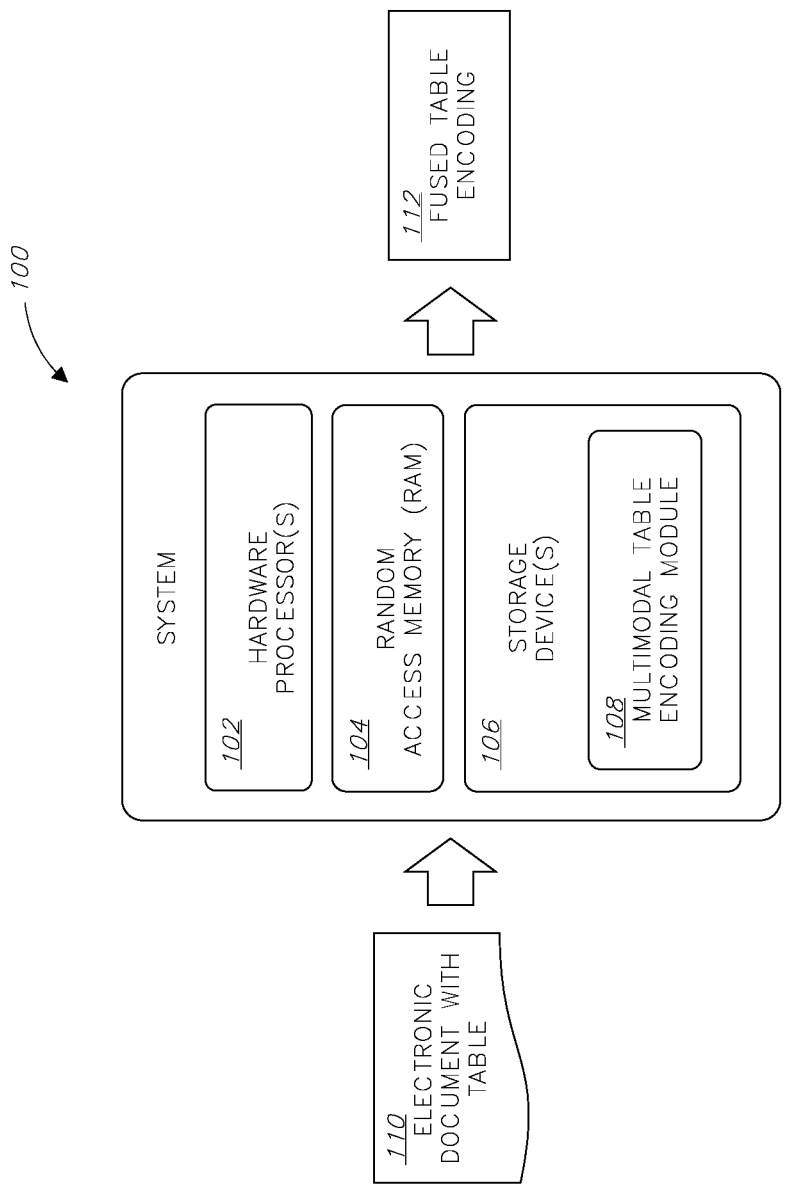
FIG. 1 shows a block diagram of an exemplary system for multimodal table encoding.

Disclosed herein is a technique, embodied in a system, method, and computer program product, for multimodal encoding of a table, such that a joint (or "fused") encoding of all modalities can be stored in an index of an information retrieval system and later used for responding to search queries. Advantageously, that joint encoding allows an Information Retrieval (IR) system to selectively return, in response to a query, only relevant portions of a table, instead of naively returning a whole table. This is facilitated, inter alia, by jointly encoding different information levels ("modalities") of each table, such as its column and/or row headers, the data it contains, and even the description surrounding it in the electronic document. Each such modality is advantageously encoded using a machine learning encoder that is specifically tailored to that modality.

In an alternative embodiment, the IR system returns a whole table, or a ranked list of tables, as the search results, but at an improved level of relevancy.

In the present technique, separate machine learning encoders are first operated to perform separate unimodal encoding of the different table modalities—its description (natural language text surrounding the table), schema (the table's column and/or row headers), rows, and columns. In order for the encoders to be also aware of the structure of the table, special markers may be added, prior to the unimodal encoding, to the boundaries of the table—such as the end of every row and column.

A Recurrent Convolutional Neural Network (RCNN) may be used for encoding the description of the table. A Multi-Layer Perceptron (MLP) may be used for encoding the schema of the table. A Three-Dimensional Convolutional Neural Network (3D-CNN) may be used to encode each of the rows and columns of the table.

Next, a machine learning gating mechanism is applied to the encoded description, schema, rows, and columns, to produce the fused encoding of the table. The fused encoding, advantageously, is representative of both the structure of the table and its content (wherein the "content" is not strictly what was contained in the table, but also the description surrounding it—which characterizes its content).

A Gated Multimodal Unit (GMU) may be used as the machine learning gating mechanism.

The fused encoding of the table (also referred to as the table's fused "representation") may be stored in an index of a computerized information retrieval system. Then, in response to a search query, the information retrieval system may conduct a search of the index and selectively return at least a portion of the table in its search results if the fused encoding satisfies the query. Advantageously, since the fused encoding represents both the structure and the content of the table, the IR system can return results that are highly-specific to factual queries. For example, the table in FIG. 3 lists the world's seven continents and various data for each continent—its population, most populous city, and area. When a user executes a fact-oriented search query such as "the most populated city in Australia," "what is the population of Asia," or "what is the second-largest continent," the IR system can leverage the fused encoding of the table and return highly-specific results (such as "Sydney," "4.5 billion," or "Africa," respectively) in a manner resembling focused extraction of structured data from a traditional database.

Reference is now made to FIG. 1, which shows a block diagram of an exemplary system 100 for multimodal table encoding, according to an embodiment. System 100 may also be referred to as an electronic document indexing system, an electronic table indexing system, or the like. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a multimodal table encoding module 108. The software components may include an operating system having various software components and/or drivers for controlling and managing general system tasks (e.g., memory management, storage device control, power management, etc.), and facilitating communication between various hardware and software components.

System 100 may operate by loading instructions of multimodal table encoding module 108 into RAM 104 as they are being executed by processor(s) 102. The instructions of multimodal table encoding module 108 may cause system 100 to receive an electronic document which includes a table 110, process the electronic document, and output a fused encoding of the table 112.

System 100, as described herein, is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Components of system 100 may be co-located or distributed (e.g., in a distributed computing architecture). Moreover, components of system 100 may be co-located or distributed, or the system could run as one or more cloud computing "instances," "containers," and/or "virtual machines," as known in the art.

The instructions of multimodal table encoding module 108 are now discussed with reference to the process (method) diagram of FIG. 2, which illustrates a method 200 for multimodal table encoding, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated that a certain step (or a portion thereof) involves manual action of a user.

In a step 202, an electronic document (referred to hereinafter simply as "document") which contains at least one table may be received. This may be a HyperText Markup Language (HTML) document, a Portable Document Format (PDF) document, a Rich-Text Format (RTF) document, a word processing document (such as a Microsoft Word document, an Open Document), a LaTex document, or any other digital file containing at least text and a table. The table may be detected and parsed using conventional techniques. Merely as an example, a table in an HTML document may be detected and parsed according to "<table>", "<tr>", "<th>", and "<td>" tags existing in the document.

The table may be regarded as including four modalities—a description (d), a schema (s), rows (r), and columns (c). These modalities may be better understood with reference to FIG. 3, which illustrates an exemplary document 300 that includes a table 302.

The description (d) modality includes natural language text that accompanies the table externally, excluding text within the table itself. This modality typically provides general, descriptive information on the table's content which improves its understanding by a reader, and is thus useful for inclusion in the fused encoding. Such information may include, for example, one or more of the following: First, the title (e.g., "Continents," as in FIG. 3) of the document which contains the table. Second, a subtitle (e.g., "Area and population" in FIG. 3) in the document, such as a section title of the section containing the table. Third, a caption of the table, which may be located either immediately before or after the table (e.g., "Table 1: Area and population" located below the table in FIG. 3).

Figure 3:
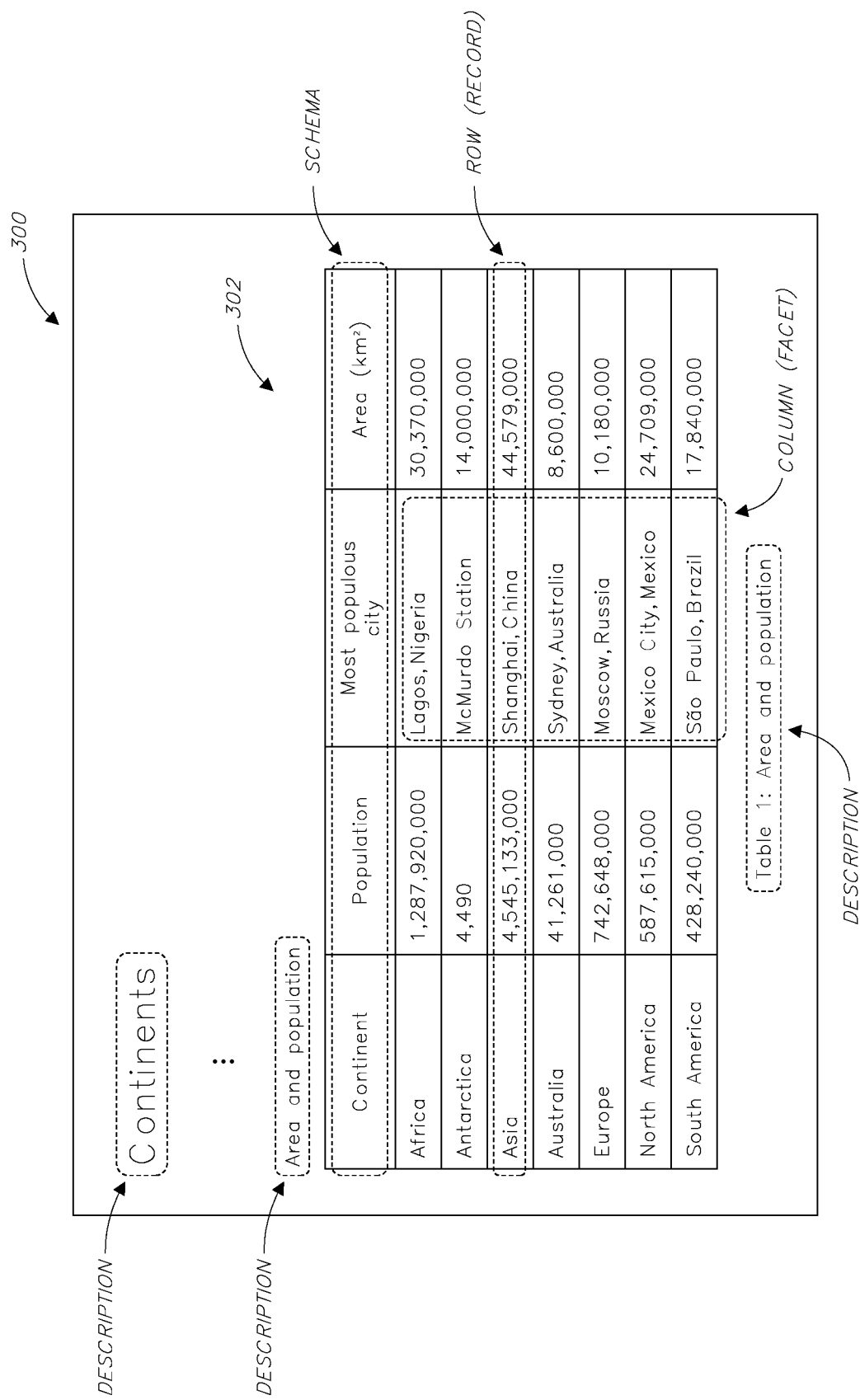
FIG. 3 shows an exemplary electronic document that includes a table.

The schema (s) modality imposes a structure on the table's content and includes M labels (i.e., $s=\{s_1, \ldots, s_M\}$), sometimes also referred to as column names, headers or headings. In FIG. 3, the labels are "Continent," "Population," "Most populoous city," and "Area (km$^2$)." Each schema label corresponds to one column of the table. Alternatively, a table's schema may be hierarchical (not shown in the figure), with some schema labels containing several sub-labels and, consequently, several associated columns. In such cases, it may be assumed that the schema is flattened, and, therefore, each label corresponds to a single column. Namely, each label that spans multiple sub-labels is considered as if it were actually duplicated for these sub-labels. Tables 1 and 2 illustrate this:

TABLE 1

| Label 1 | |
| --- | --- |
| Sub-label 1.1 | Sub-label 1.2 |

TABLE 2

| Label 1 | Label 1 |
| --- | --- |
| Sub-label 1.1 | Sub-label 1.2 |

Assuming that the given table is arranged like Table 1, with "Label 1" spanning two sub-labels "Sub-label 1.1" and "Sub-label 1.2," it may be considered as if it were arranged like Table 2, with "Label 1" duplicated to separately span Sub-label 1.1" and "Sub-label 1.2," such that each instance of "Label 1" corresponds to a single column.

To some extent, each schema label has a semantic role in implying what type of data is populated within the corresponding column's cells. Labels are often very short in text, may be abbreviated, and sometimes even hard to interpret by many readers. Moreover, some table schemata may capture metadata-level information having complex semantic structures, such as hierarchical or functional dependencies, data constraints, etc. This calls for encoding the table schema in a special manner, differently than how the text of the table's description, for example, is encoded.

The table's rows (r) modality includes N table rows (i.e., $r=\{r_1, \ldots, r_N\}$), sometimes also referred to as "records" or "lines." In turn, each row $r_i$ includes multiple data cells, with each cell typically corresponding to one of the table columns. In certain tables, however, a data cell may span over multiple adjacent columns. Such tables may be treated similarly to how labels with sub-labels are treated above—considering the table as flattened, where each such data cell is duplicated for the columns it spans. From an IR perspective, table rows may represent entities of interest or facts that can be used for answering queries that require selecting specific information from the table.

The table's columns (c) modality includes M table columns (i.e., $c=\{c_1, \ldots, c_M\}$), sometimes also referred to as "facets," which vertically divide the table's data. Each column $c_j$ is defined by a group of data cells that each typically correspond to a different row. Columns allow answering queries that express information needs about one or more (optionally aggregative) properties of a group of rows, e.g., "population and area per continent," "average continent area," etc.

Figure 2:
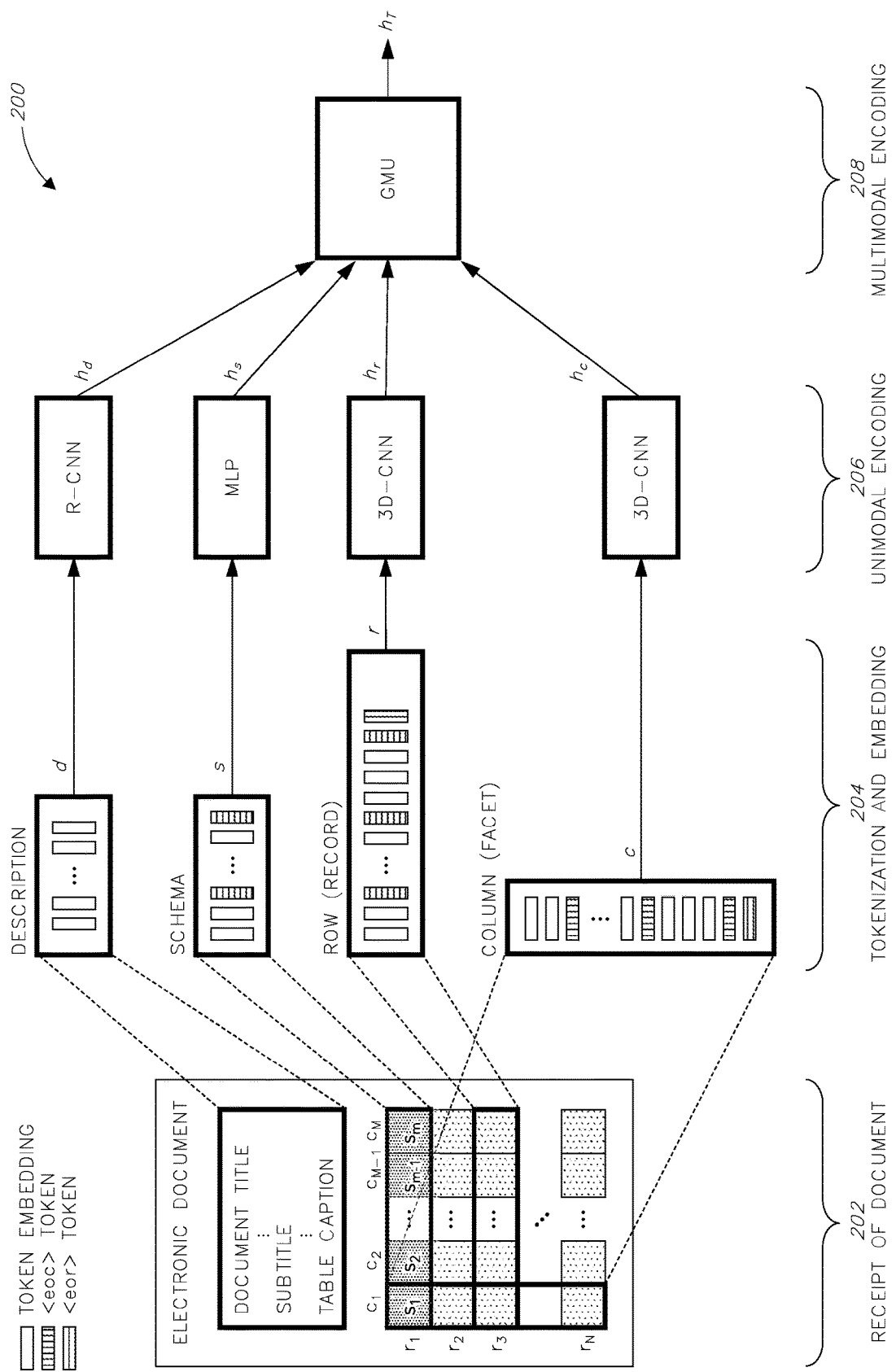
FIG. 2 shows a process diagram of a method for multimodal table encoding.

Reference is now made back to FIG. 2. In a pre-processing step 204, each of the modalities may be tokenized and embedded. The tokenization may include, as conventionally done in the field of Natural Language Processing (NLP), separating the contents of each modality into discrete words, a process which also involves removing any punctuation marks. For example, tokenization of the text "São Paulo, Brazil" may yield three tokens: "São" "Paulo" and "Brazil". For numerical contents, such as the number "30,370,000", the tokenization may only involve the removal of the thousands separator, or any other symbol used for enhancing readability but not required for true numerical representation. The tokenization may yield a sequence of $L_m$ tokens $\langle x_1^m, x_2^m, \ldots, x_{L_m}^m \rangle$ per modality $m \in \{d, s, r, c\}$. Optionally, the length of the token sequences of the different modalities is kept uniform by applying padding to any sequence which includes less than $L_m$ tokens—with $L_m$ representing the longest sequence of any of the modalities.

Next, the embedding of the tokens may also be performed according to conventional NLP techniques. For example, the GloVe algorithm may be utilized (see J. Pennington et al., "GloVe: Global Vectors for Word Representation," Online at https://nlp.stanford.edu/pubs/glove.pdf, last viewed May 24, 2020). The embedding involves representing each token as a vector of numbers, in a way which ensures that contextually-similar tokens yield similar embeddings. For modality m, the embedded tokens are $\langle e_1^m, e_2^m, \ldots, e_{L_m}^m \rangle$, with $e_t^m \in \mathbb{R}^E$ representing the $t^{th}$ token for that modality m. For notation simplicity, whenever the modality is clear from the context, its embedded token are denoted simply by $\langle e_1, e_2, \ldots, e_L \rangle$.

In addition, for the non-descriptive (structural) table modalities (i.e., $m \in \{s, r, c\}$), two types of special tokens may be advantageously added: an end-of-column ($\langle eoc \rangle$) token and end-of-row ($\langle eor \rangle$) token, as follows:

For the schema, a $\langle eoc \rangle$ token may be added at the end of each column labels, namely—following the embedded token(s) of each label.

For the rows, a $\langle eoc \rangle$ token may be added after each data cell of a row, namely—following the embedded token(s) of each such data cell. In addition, a $\langle eor \rangle$ token may be added at the end of each row (following the $\langle eoc \rangle$ token of the last data cell om the row).

For the columns, a $\langle eor \rangle$ token may be added after each data cell of a column, namely—following the embedded token(s) of each such data cell. In addition, a $\langle eoc \rangle$ token may be added at the end of each column (following the $\langle eor \rangle$ token of the last data cell in the column).

These token types, which mark the boundaries of the table (end of every row and column), cause the schema, rows, and columns modalities to be encoded together with a structural definition of the table. They signal the structure to the machine learning encoders that will next encode these modalities.

$\langle eor \rangle$ and $\langle eoc \rangle$ are of course only examples of tokens which may be used to mark the boundaries of the table. Any other type of marking of the table's boundaries, which becomes embedded with the pertinent modalities, is explicitly intended herein.

For simplicity of presentation, FIG. 2 only illustrates the tokenization and embedding of a single row and a single column of the table, but step 204 of course produces, for each of these modalities, a token sequence of all rows/columns existing in the table.

As step 204 concludes, it provides a token sequence for each of the modalities, including both the token embeddings as well as the $\langle eor \rangle$ and $\langle eoc \rangle$ tokens (if added).

In a step 206, unimodal encoding of each of the modalities may be separately performed, as follows:

The description modality: A first type of machine learning encoder may be operated for encoding the token sequence of the description modality. This type of machine learning encoder may be one which is particularly suitable for processing natural language input. For example, this may be an RCNN, which has shown to be highly-effective for text classification and similar NLP tasks. RCNN, as known in the art, is a bidirectional Long Short-Term Memory (bi-LSTM) followed by a max-pooling layer. Applying the bi-LSTM, the input (token sequence modality d) is processed from left-to-right $\langle e_1, e_2, \ldots, e_L \rangle$ and from right-to-left $\langle e_L, e_{L-1}, \ldots, e_1 \rangle$, obtaining two LSTM hidden states for each token: $h_t^{LSTM-l2r}$ and $h_t^{LSTM-r2l}$, respectively. The representation of each token is then composed of its left-to-right context $h_t^{LSTM-l2r}$, its initial embedding $e_t$, and its right-to-left context $h_t^{LSTM-l2r}$. Then, a tanh activation is employed to obtain a representation that is fed to the convolutional part of the RCNN:

$$h_t^{FC} = \tanh(W_{FC}[h_t^{LSTM-l2r}, e_t, h_t^{LSTM-r2l}] + b_{FC}).$$

Having a recurrent representation for each token $h_t^{FC}$, a max-pooling layer is then applied to extract the dominant recurrent features over the full text of the description, i.e.:

$$h^{maxPool} = \max_{t=1}^{L} h_t^{FC},$$

where max denotes an element-wise maximum function. The pooling layer allows to obtain a unified vector representation over all the tokens, capturing the most important latent factors in this textual modality.

Applying the first type of machine learning encoder, such as the RCNN, produces the latent representation $h_d$ (namely, encoding) for the description modality.

The schema modality: A second type of machine learning encoder may be operated for encoding the token sequence of the schema modality. This type of machine learning encoder may be one which is particularly suitable for processing and representing unordered series of tokens—each schema label may be considered as an unordered series of tokens. For example, this may be a Multi-Layer Perceptron (MLP), for which the schema may be modeled as an unordered set of token sequences (a sequence per schema label), where the special $\langle eoc \rangle$ token separates consecutive label sequences. Aiming to capture both latent intra- and inter-label relationships, two fully connected layers may be first applied over each token embedding, as follows:

$$h_t^{mlp0} = \text{ReLU}(W_{mlp0} e_t + b_{mlp0}),$$

$$h_t^{mlp1} = \text{ReLU}(W_{mlp1} h_t^{mlp0} + b_{mlp1}).$$

Then, the sequences of all hidden states $\tilde{h} = [h_1^{mlp1}, h_2^{mlp1}, \ldots, h_{L_m}^{mlp1}]$ may be concatenated. Finally, the schema's latent representation (i.e., encoding) $h_s$ may be obtained by first applying a third fully connected layer and then applying the tanh activation, i.e.: $h_s \stackrel{\text{def}}{=} \tanh(W_{mlp2} \tilde{h} + b_{mlp2})$.

Another example of a suitable machine learning encoder is a transformer model. A transformers is designed to handle ordered sequences of data, such as natural language. However, unlike recurrent networks, transformers do not require that the sequence be processed in order. So, if the data in question (each label of the schema) is natural language, the transformer does not need to process the beginning of a label before it processes the end.

The rows and columns modalities: A third type of machine learning encoder may be operated, separately, for encoding the token sequence of rows modality and the token sequence of columns modality. This type of machine learning encoder may be one which is particularly suitable for multi-dimensional input. For example, this may be a 3D-CNN. Having an E-dimensional embedding for each token of these modalities, as well as the special ⟨eoc⟩ and ⟨eor⟩ tokens, the token sequence of each modality is essentially a three-dimensional matrix: one dimension corresponding to the latent dimension projected by the embedding, the second dimension corresponding to the position of the token within the sequence, and the third dimension corresponding to the structure signaled by the ⟨eoc⟩ and ⟨eor⟩ tokens.

Given the sequence of tokens for each of these two modalities, an embedding may be extracted for the tokens associated with each data cell in the row or column, by averaging the embeddings within the cell; i.e., horizontally between every adjacent ⟨eoc⟩ tokens in the case of rows, and vertically between every adjacent ⟨eor⟩ tokens in the case of columns. Then, a three-dimensional matrix may be extracted by viewing each latent feature as an entry (x, y, z) with $x \in \{1, \ldots, E\}$ embedding feature, $y \in \{1, \ldots, M\}$ column, and $z \in \{1, \ldots, N\}$ row. The application of 3D convolution layers may be seen as regular 2D matrix multiplication by flattening the 3D representation of the input and multiplying it by flattened 3D filters. The value at position (x, y, z) on the $f^{th}$ feature map in the $l^{th}$ layer is:

$$h_{lf}^{xyz} = \tanh(\Sigma_p \Sigma_{p=0}^{P_l-1} \Sigma_{q=0}^{Q_l-1} \Sigma_{s=0}^{S_l-1} w_{lf}^{pqs} h_{(l-1)f}^{(x+p)(y+q)(z+s)} + b_{lf}).$$

where $P_l$, $Q_l$, $R_l$ are the kernel sizes along the three dimensions, $w_{lf}^{pqs}$ is the (p, q, s)$^{th}$ value of the $f^{th}$ feature in the $(l-1)^{th}$ layer, and $b_{lf}$ is the bias of the $l^{th}$ layer on the $f^{th}$ feature map.

In this exemplary 3D-CNN architecture, three convolutional layers with ReLU activation and max pooling (as defined above) are applied to obtain latent representations (encodings) for the rows ($h_r$) and columns ($h_c$) modalities.

Next, in a step 208, multimodal encoding of the latent representations ($h_d$, $h_s$, $h_r$, $h_c$) of all modalities is performed, such as by applying a machine learning gating mechanism to these separately-encoded modalities, to produce a fused encoding of the table ($h_T$).

For example, the gating mechanism may include a GMU (see J. Arevalo et al., "Gated Multimodal Units for Information Fusion," in the 5$^{th}$ International Conference on Learning Representations (ICLR), Toulon, France, April 2017). The GMU receives the latent representations ($h_d$, $h_s$, $h_r$, $h_c$) as input (denoted herein $m_1$, $m_2$, $m_3$, and $m_4$ for simplicity) and then computes an intermediate representation $h_{m_i}'$ for each modality using an independent encoding of its original representation $h_{m_i}$. These intermediate representations are then combined using a gate neuron (z) that controls the contribution of each one to the joint representation (encoding) $h_{GMU}$. A formal definition of the GMU is as follows:

$$h_{m_i}' = \tanh(W_h^{m_i} h_{m_i}),$$

$$h = [h_{m_1}', h_{m_2}', \ldots, h_{m_G}'],$$

$$z = \sigma(W_z[h_{m_1}, h_{m_2}, \ldots, h_{m_G}]),$$

$$h_{GMU} = h \odot z,$$

where $m_i$ is the $i^{th}$ modality and $\odot$ denotes element-wise multiplication.

Following step 208, the fused encoding of the table ($h_T$, or $h_{GMU}$ in the specific example given here) may be stored in an index of an IR system.

Notably, the steps of method 200 may be repeated for each table-containing document whose inclusion in the index on the IR system is desired. For example, if the IR system is an Internet search engine which indexes documents on the World Wide Web, the search engine may employ method 200 every time it detects a table in a document which it attempts to index; the search engine may index the table using method 200, and the remainder of the document using the search engine's regular indexing technique (which is not table-oriented). An organizational IR system, or any type of IR system which indexes and searches specific corpora, may operate according to the same principles.

Figure 4:
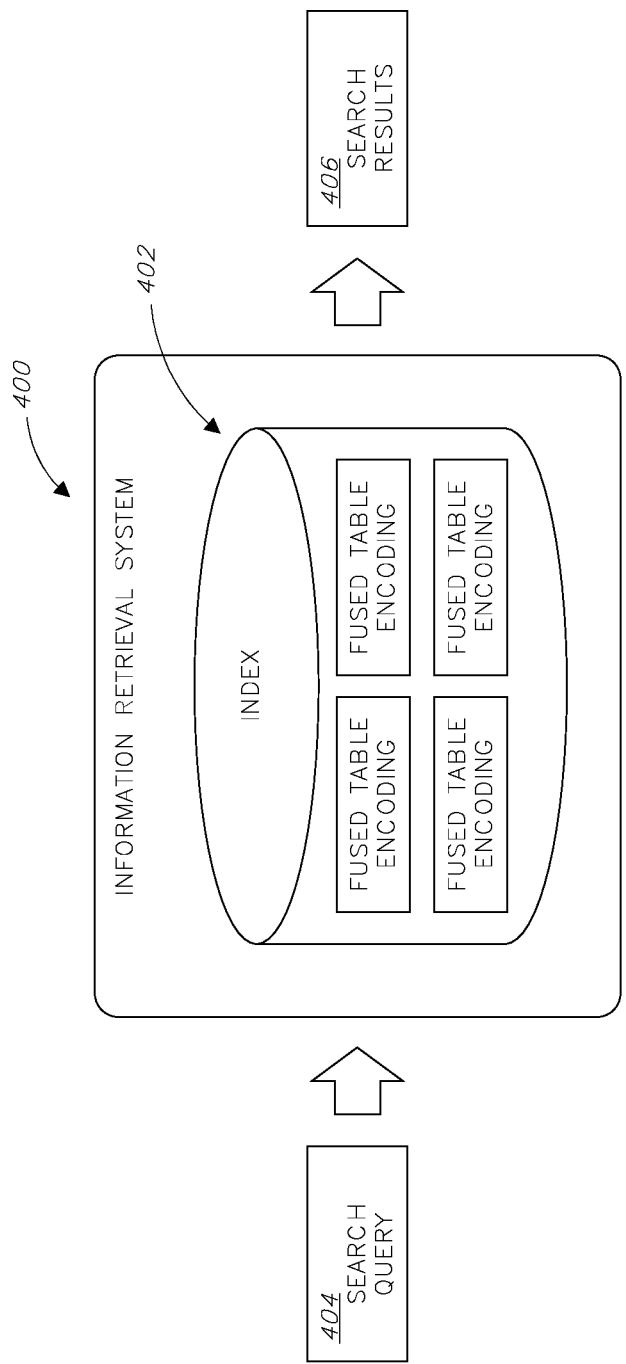
FIG. 4 shows a block diagram of an exemplary information retrieval system.

Reference is now made to FIG. 4, which shows a block diagram of an exemplary IR system 400 that leverages the fused table encodings produced by method 200 (of FIG. 2) to enhance its query answering. The discussed operation of IR system 400 is to be considered a method for information retrieval and/or table retrieval, according to certain embodiments. IR system 400 may include some or all of the hardware and/or software components discussed above in relation to system 100 (FIG. 1). In an embodiment, system 100 (FIG. 1) and IR system 400 (FIG. 4) may be realized by a single system, referred to either as an IR system, an indexing and searching system, or the like.

IR system 400 includes an index 402 which stores fused table encodings of various tables included in documents which are part of the corpus the system is tasked with indexing and searching.

In response to a search query 404 being received at IR system 400, the system may process the query (q) in a similar fashion to the processing of a description modality in steps 204 and 206 of FIG. 2, because the query is similarly assumed to be written in natural language: the query may be first tokenized and embedded, and then unimodally encoded with the first type of machine learning encoder—the same one used to encode the description modality. For example, this could be the same RCNN encoder of step 206 of FIG. 2. The unimodal encoding of the query produces its latent representation $h_q$.

Next, IR system 400 may search, based on the encoded query ($h_q$), among the fused table encodings stored in its index, and return search results 406. Due to the multimodal encoding of the tables, as well as the special tokens used therein to mark the structure of the tables, IR system 400 may selectively return only one or more relevant portions (e.g., data cells) of a table, and not the entire contents of the table (except if the query specifically calls for all contents). For example, with reference to the table shown in FIG. 3, if the query is "what is the population of Australia," IR system 400 may return "41,261,000", which is the data cell at the intersection of the "Australia" row and the "Population" label. Similarly, if the query is "what is the combined area of all continents," IR system 400 may compute an aggregate of the data cells in the rightmost column of the table, and return "150,278.00 km²." In other words, the information contained in a single relevant data cell of the pertinent table, or in several relevant data cells, may be returned as the search results.

Alternatively, it is possible to return a whole table, or even a ranked list of whole tables, in response to search query. Although a whole table may not provide a specific answer to the user's intent but rather require him or her to read the table in order to find the relevant information, the present technique may still be beneficial because it retrieves the correct table, or correctly ranks a list of tables, in a manner highly relevant to the query.

Experimental Results

The present multimodal table encoding technique (FIG. 2) with its associated IR system operation (FIG. 4) were tested against various state-of-the-art table retrieval techniques, to evaluate the contribution of the multimodal table encoding to table retrieval performance.

A first experiment was conducted on the WikiTables corpus (C. S. Bhagavatula et al., "Methods for Exploring and Mining Tables on Wikipedia," in Proceedings of IDEA'13, Chicago, Ill., USA, 2013; and C. S. Bhagavatula et al., "TabEL: Entity Linking in Web Tables," in Proceedings of The 14$^{th}$ International Semantic Web Conference, 2015) which includes approximately 1.6 million tables extracted from Wikipedia, The Free Encyclopedia. The corpus also includes, for each table, its Wikipedia article title, section title, and caption.

The first experiment evaluated the performance of the present technique in retrieving relevant tabular information based on a pool of 60 ad-hoc queries proposed by S. Zhang et al., "Ad Hoc Table Retrieval using Semantic Similarity," in Proceedings of the Web Conference 2018, April 2018. The present technique was used to index the WikiTables corpus and then to execute the 60 ad-hoc queries (which were each processed in the manner described above, with reference to IR system 400) on the index.

The performance evaluation included comparing the tabular information retrieved by the present technique to the ground truth defined by Zhang (2018), which manually labeled each of the tables in the corpus as irrelevant to each of the 60 queries (grade 0), relevant to each of the 60 queries (grade 1), or highly relevant to each of the 60 queries (grade 2). Notably, the work of Zhang (2018) is limited to retrieval of whole tables in response to a query, and does not address the task of retrieving only partial tabular data (e.g., a single data cell) that directly answer the query. Accordingly, only the ability of the present technique to retrieve relevant tables was evaluated in the first experiment.

The performance of the present technique against that of seven state-of-the-art table retrieval techniques is presented in Table 3. Table retrieval quality was evaluated using Precision (P) at cutoffs k∈{5,10}, Normalized Discounted Gain (NDCG) at cutoffs k∈{5,10,20}, and Mean Average Precision (MAP). The "trec_eval" tool, provided by the National Institute of Standards and Technology at https://trec.nist.gov/trec_eval (last viewed May 25, 2020), was used to compute the various evaluation measures for the present technique, and publicly-available TREC files (by the "trec_eval" tool) of the other seven techniques were downloaded and used to populate the respective rows in the table below.

"Single-field" is a technique proposed by M. Cafarella et al., "WebTables: Exploring the Power of Tables on the Web," VLDB '08, Auckland, New Zealand, 2008, which represents all table properties within a single-field text document. Documents were scored using BM25 similarity.

"Multi-field" is a technique proposed by R. Pimpikar et al., "Answering Table Queries on the Web using Column Keywords," in Proceedings of the VLDB Endowment (PVLDB), Vol. 5, No. 10, pp. 908-919 (2012), which represents tables as multi-field documents, having each table property kept within a different field and scored using BM25 similarity.

"NRM-F" is a technique proposed by H. Zamani et al., "Neural Ranking Models with Multiple Document Fields," in Proceedings of WSDM '18, Los Angeles, Calif., USA (2018), which serves as a prominent multi-field document retrieval alternative, applied to the present task. To this end, each table property is treated again as a text field. As this method's code is not publicly available, it was implemented it by closely following its published paper.

"LTR" is a technique proposed by Zhang (2018), which implements a pointwise learning-to-rank (LTR) method, trained using different query, table and query-table features (18 in total).

"STR" is another technique proposed by Zhang (2018), which extends LTR with 16 additional semantic table similarity features: bag-of-concepts, bag-of-entities, word and graph embeddings (calculated using various early and late fusion strategies).

"T2VW" and "T2VE" are techniques proposed by L. Deng et al., "Table2Vec: Neural Word and Entity Embeddings for Table Population and Retrieval," in Proceedings of SIGIR 2019, July 2019, which extend the LTR feature-set with Table2Vec (T2V) embeddings learned from words (in T2VW) or entities (in T2VE) appearing in the table.

As seen in Table 3, the present technique performed considerably better than these seven state-of-the-art table retrieval techniques.

A second experiment was conducted on a corpus generated specifically for that experiment, which contains approximately 75,000 tables extracted from Wikipedia, The Free Encyclopedia. This corpus also includes, for each table, its Wikipedia article title, section title, and caption—as in WikiTables. The tables are accompanied by a set of 610 natural language queries each having a single table as a correct answer. The tables are respectively labeled as irrelevant (grade 0) or relevant (grade 1) for each query.

The performance of the present technique against that of three of the seven state-of-the-art table retrieval techniques is presented in Table 4. The remaining four retrieval techniques were not evaluated because their full feature sets are not publicly available, but it is estimated that their performance is inferior to the present technique also when applied to the special corpus of the second experiment.

TABLE 3

| Method | P@5 | P@10 | N@5 | N@10 | N@20 | MAP |
|---|---|---|---|---|---|---|
| Single-field | 47.33 | 42.17 | 47.81 | 49.27 | 55.22 | 39.86 |
| Multi-field | 54.00 | 46.50 | 54.13 | 55.92 | 61.15 | 44.77 |
| NRM-F | 52.28 | 45.79 | 54.17 | 58.82 | 64.97 | 48.39 |
| LTR | 52.67 | 45.17 | 55.27 | 54.56 | 60.31 | 41.12 |
| STR | 58.33 | 53.67 | 59.51 | 62.93 | 68.25 | 51.41 |
| T2VW | 56.67 | 50.67 | 59.74 | 60.96 | 65.05 | 46.75 |
| T2VE | 55.00 | 47.00 | 56.02 | 55.69 | 61.61 | 41.76 |
| Present technique | 64.56 | 56.49 | 66.31 | 68.13 | 73.70 | 60.58 |

TABLE 4

| Method | P@5 | P@10 | N@5 | N@10 | N@20 | MAP |
|---|---|---|---|---|---|---|
| Single-field | 8.29 | 4.49 | 32.34 | 34.93 | 36.70 | 30.91 |
| Multi-field | 8.06 | 5.03 | 31.87 | 35.18 | 37.59 | 31.13 |
| NRM-F | 12.67 | 7.12 | 50.64 | 53.17 | 54.47 | 47.81 |
| Present technique | 18.26 | 9.90 | 69.45 | 71.98 | 72.20 | 63.28 |

As seen in Table 4, the present technique performed substantially better than these three state-of-the-art table retrieval techniques also when tested on the special corpus of the second experiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, automatically:
receiving an electronic document that contains a table, wherein:
the table comprises: multiple rows, multiple columns, and a schema comprising column labels or row labels, and
the electronic document comprises a description of the table which is located externally to the table;
operating separate machine learning encoders to separately encode the description of the table, the schema of the table, each of the rows of the table, and each of the columns of the table, respectively, the machine learning encoders including a neural network to encode the description of the table, wherein:
the schema of the table is encoded together with end-of-column tokens or end-of-row tokens, that mark an end of each of the column or row labels, respectively,
each of the rows of the table is encoded together with end-of-column tokens that mark an end of each data cell of the respective row, and with an end-of-row token that marks an end of the respective row, and
each of the columns of the table is encoded together with end-of-row tokens that mark an end of each data cell of the respective column, and with an end-of-column token that marks an end of the respective column;
applying a machine learning gating mechanism to the encoded description, encoded schema, encoded rows, and encoded columns, to produce a fused encoding of the table, wherein the fused encoding is representative of both a structure of the table and a content of the table; and
storing the fused encoding of the table in an index of a computerized information retrieval system.

2. The method of claim 1, wherein the separate machine learning encoders comprise a Multi-Layer Perceptron (MLP) that encodes the schema of the table, or a transformer that encodes the schema of the table.

3. The method of claim 1, wherein the separate machine learning encoders comprise: a first Three-Dimensional Convolutional Neural Network (3D-CNN) that encodes the rows of the table; and a second 3D-CNN that encodes the columns of the table.

4. The method of claim 1, wherein the machine learning gating mechanism comprises a Gated Multimodal Unit (GMU).

5. The method of claim 1, further comprising, prior to the encoding of the description, schema, rows, and columns: automatically transforming the description, schema, rows, and columns into token embeddings.

6. The method of claim 1, further comprising, automatically: receiving a search query; operating the machine learning encoder that encoded the description to encode the search query; and operating the computerized information retrieval system to search the index based on the encoded search query, and to return at least some of the table as a search result.

7. The method of claim 6, further comprising, prior to encoding the search query: automatically transforming the search query into one or more token embeddings.

8. A system comprising:
(a) at least one hardware processor; and
(b) a non-transitory computer-readable storage medium having program code embodied therewith, the program code executable by said at least one hardware processor to, automatically:
receive an electronic document that contains a table, wherein:
the table comprises: multiple rows, multiple columns, and a schema comprising column labels or row labels, and
the electronic document comprises a description of the table which is located externally to the table;
operate separate machine learning encoders to separately encode the description of the table, the schema of the table, each of the rows of the table, and each of the columns of the table, respectively, the machine learning encoders including a neural network to encode the description of the table, wherein:
the schema of the table is encoded together with end-of-column tokens or end-of-row tokens, that mark an end of each of the column or row labels, respectively,
each of the rows of the table is encoded together with end-of-column tokens that mark an end of each data cell of the respective row, and with an end-of-row token that marks an end of the respective row, and
each of the columns of the table is encoded together with end-of-row tokens that mark an end of each data cell of the respective column, and with an end-of-column token that marks an end of the respective column;
apply a machine learning gating mechanism to the encoded description, encoded schema, encoded rows, and encoded columns, to produce a fused encoding of the table, wherein the fused encoding is representative of both a structure of the table and a content of the table; and
store the fused encoding of the table in an index of a computerized information retrieval system.

9. The system of claim 8, wherein the separate machine learning encoders comprise a Multi-Layer Perceptron (MLP) that encodes the schema of the table, or a transformer that encodes the schema of the table.

10. The system of claim 8, wherein the separate machine learning encoders comprise: a first Three-Dimensional Convolutional Neural Network (3D-CNN) that encodes the rows of the table; and a second 3D-CNN that encodes the columns of the table.

11. The system of claim 8, wherein the machine learning gating mechanism comprises a Gated Multimodal Unit (GMU).

12. The system of claim 8, wherein the program code is further executable by said at least one hardware processor, prior to the encoding of the description, schema, rows, and columns, to: automatically transform the description, schema, rows, and columns into token embeddings.

13. The system of claim 8, wherein the program code is further executable by said at least one hardware processor to, automatically: receive a search query; operate the machine learning encoder that encoded the description to encode the search query; and operate the computerized information retrieval system to search the index based on the encoded search query, and to return at least some of the table as a search result.

14. The system of claim 13, wherein the program code is further executable by said at least one hardware processor, prior to encoding the search query, to: automatically transform the search query into one or more token embeddings.

15. A computer program product comprising a non-transitory computer-readable storage medium having program code embodied therewith, the program code executable by at least one hardware processor to:
receive an electronic document that contains a table, wherein:
the table comprises: multiple rows, multiple columns, and a schema comprising column labels or row labels, and
the electronic document comprises a description of the table which is located externally to the table;
operate separate machine learning encoders to separately encode the description of the table, the schema of the table, each of the rows of the table, and each of the columns of the table, respectively, the machine learning encoders including a neural network to encode the description of the table, wherein:
the schema of the table is encoded together with end-of-column tokens or end-of-row tokens, that mark an end of each of the column or row labels, respectively,
each of the rows of the table is encoded together with end-of-column tokens that mark an end of each data cell of the respective row, and with an end-of-row token that marks an end of the respective row, and
each of the columns of the table is encoded together with end-of-row tokens that mark an end of each data cell of the respective column, and with an end-of-column token that marks an end of the respective column;
apply a machine learning gating mechanism to the encoded description, encoded schema, encoded rows, and encoded columns, to produce a fused encoding of the table, wherein the fused encoding is representative of both a structure of the table and a content of the table; and
store the fused encoding of the table in an index of a computerized information retrieval system.

16. The computer program product of claim 15, wherein the separate machine learning encoders comprise:
a Recurrent Convolutional Neural Network (RCNN) that encodes the description of the table;
a Multi-Layer Perceptron (MLP) that encodes the schema of the table, or a transformer that encodes the schema of the table;
a first Three-Dimensional Convolutional Neural Network (3D-CNN) that encodes the rows of the table; and a second 3D-CNN that encodes the columns of the table.

17. The computer program product of claim 15, wherein the machine learning gating mechanism comprises a Gated Multimodal Unit (GMU).

18. The computer program product of claim 15, wherein the program code is further executable by said at least one hardware processor to, automatically:
receive a search query;
operate the machine learning encoder that encoded the description to encode the search query; and
operate the computerized information retrieval system to search the index based on the encoded search query, and to return at least some of the table as a search result.

* * * * *